US010282092B1

(12) United States Patent
Jain (10) Patent No.: US 10,282,092 B1
(45) Date of Patent: May 7, 2019

(54) METHODS AND SYSTEMS FOR CREATING AND MAINTAINING A LIBRARY OF VIRTUAL HARD DISKS

(71) Applicant: Citigroup Technology, Inc., Weehawken, NJ (US)

(72) Inventor: Parul K. Jain, East Windsor, NJ (US)

(73) Assignee: CITIGROUP TECHNOLOGY, INC., Weehawken, NJ (US)

( * ) Notice: Subject to any disclaimer, the term of this patent is extended or adjusted under 35 U.S.C. 154(b) by 282 days.

(21) Appl. No.: 14/848,528

(22) Filed: Sep. 9, 2015

(51) Int. Cl.
*G06F 3/06* (2006.01)

(52) U.S. Cl.
CPC .......... *G06F 3/0604* (2013.01); *G06F 3/0631* (2013.01); *G06F 3/0635* (2013.01); *G06F 3/0664* (2013.01); *G06F 3/0683* (2013.01)

(58) Field of Classification Search
CPC .... G06F 3/0664; G06F 9/5077; G06F 9/5088; G06F 9/4856; G06F 2009/45562; G06F 2009/4557
See application file for complete search history.

(56) References Cited

U.S. PATENT DOCUMENTS

| | | | | |
|---|---|---|---|---|
| 6,405,202 B1 * | 6/2002 | Britton | ............... | G06F 17/30607 |
| 8,601,583 B1 * | 12/2013 | Chandrasekhar | ....... | G06F 21/54 726/24 |
| 9,037,547 B1 * | 5/2015 | Shivdeo | ............ | G06F 17/30575 707/664 |
| 9,311,375 B1 * | 4/2016 | Naik | ................. | G06F 17/30581 |
| 9,396,006 B2 * | 7/2016 | Kundu | ..................... | G06F 9/455 |
| 9,641,406 B1 * | 5/2017 | Allen | ...................... | H04L 43/04 |
| 2002/0069369 A1 * | 6/2002 | Tremain | .............. | H04L 63/0209 726/14 |
| 2011/0119668 A1 * | 5/2011 | Calder | .................. | G06F 3/0604 718/1 |
| 2011/0145199 A1 * | 6/2011 | Prasad Palagummi | ...................... | G06F 11/1469 707/654 |
| 2011/0184993 A1 * | 7/2011 | Chawla | ............... | G06F 9/45533 707/802 |
| 2011/0213765 A1 * | 9/2011 | Cui | .................... | G06F 17/30864 707/711 |
| 2012/0084414 A1 * | 4/2012 | Brock | .................. | G06F 9/5077 709/221 |

(Continued)

OTHER PUBLICATIONS

Carrión, Jose V., et al. "A generic catalog and repository service for virtual machine images." 2nd International ICST Conference on Cloud Computing (CloudComp 2010). 2010.*

*Primary Examiner* — Ramon A. Mercado
(74) *Attorney, Agent, or Firm* — Johnson, Marcou & Isaacs, LLC; John M. Harrington, Esq.

(57) ABSTRACT

Methods and systems for creating and maintaining a virtual library of virtual hard disks involve one or more processors partitioning resources on a physical host computer into at least one virtual machine having at least one virtual hard disk attached to the virtual machine and loading pre-selected custom content on the virtual hard disk. Thereafter, the virtual hard disk may be detached from the virtual machine and cataloged in a database together with control parameters limiting cloning of the detached virtual hard disk. At a later time, the cataloged virtual hard disk loaded with the pre-selected custom content may be attached from the database to the virtual machine on the physical host computer.

20 Claims, 6 Drawing Sheets

(56) References Cited

U.S. PATENT DOCUMENTS

| | | | |
|---|---|---|---|
| 2012/0144391 A1* | 6/2012 | Ueda | G06F 9/45558 |
| | | | 718/1 |
| 2013/0086585 A1* | 4/2013 | Huang | G06F 9/5072 |
| | | | 718/1 |
| 2013/0232484 A1* | 9/2013 | Chieu | G06F 9/45558 |
| | | | 718/1 |
| 2013/0346616 A1* | 12/2013 | Miki | G06F 9/4856 |
| | | | 709/226 |
| 2014/0172783 A1* | 6/2014 | Suzuki | G06F 8/63 |
| | | | 707/609 |
| 2014/0282511 A1* | 9/2014 | Zheng | G06F 9/45558 |
| | | | 718/1 |
| 2014/0282518 A1* | 9/2014 | Banerjee | G06F 9/45533 |
| | | | 718/1 |
| 2015/0033221 A1* | 1/2015 | Chari | H04L 63/105 |
| | | | 718/1 |
| 2015/0331635 A1* | 11/2015 | Ben-Shaul | G06F 9/5061 |
| | | | 711/120 |
| 2016/0103712 A1* | 4/2016 | Thakkar | G06F 17/30156 |
| | | | 707/610 |

* cited by examiner

FIG. 1

| | | |
|---|---|---|
| 202 | LOCATION | ADDRESS USED TO LOCATE AN IMAGE IN THE HOST FILE SYSTEM OR EXTERNAL STORAGE SYSTEM FOR THE PURPOSE OF PERFORMING MOVE, CLONE, DELETE AND ATTACH FUNCTIONS. EACH RECORD HAS A UNIQUE LOCATION |
| 204 | DATE | DATE AND TIME WHEN IMAGE WAS CREATED |
| 206 | OWNER | USER IDENTIFIER OF A USER THAT PERFORMS A DETACH OR CLONE OPERATION |
| 208 | SIZE | STORAGE SPACE IN GIGABYTES CONSUMED BY AN IMAGE |
| 210 | DESCRIPTION | USER-PROVIDED TEXT THAT DESCRIBES THE CONTENTS OF AN IMAGE |
| 212 | CLONE ACCESS CONTROL | A LIST OF USER IDENTIFIERS OR USERS WHO ARE ALLOWED TO CLONE AN IMAGE. DEFAULT CLONE ACCESS CONTROL IS BLANK WHICH MEANS ONLY AN OWNER MAY CLONE AN IMAGE. ONLY AN OWNER IS ALLOWED TO CHANGE THE CLONE ACCESS CONTROL |

| | |
|---|---|
| DATE > 1/1/2015 AND DESCRIPTION=*MONGODB* | LIST ALL IMAGES THAT WERE CREATED IN YEAR 2015 OR LATER AND WHOSE DESCRIPTION CONTAINS THE WORD "MONGODB" |
| SIZE <10GB | LIST IMAGES WHOSE SIZE IS LESS THAN Q0 GIGABYTES |
| OWNER=JOHNSMITH | LIST IMAGES WHOSE OWNER IS USER IDENTIFIER JOHNSMITH |
| LOCATION=*EXTERNALSTORAGENAME* | LIST IMAGES ON ESS |

FIG. 5

FIG. 6

METHODS AND SYSTEMS FOR CREATING AND MAINTAINING A LIBRARY OF VIRTUAL HARD DISKS

FIELD OF THE INVENTION

The present invention relates generally to the field of virtual machines and more particularly to methods and systems for creating and maintaining a library of virtual hard disks for virtual machines.

BACKGROUND OF THE INVENTION

Currently, hard disks are employed as data storage devices within most computers. These hard disks typically store pictures, music, documents and applications, as well as the operating system that is required for the computer to start or boot and for applications to run. In the last decade, virtual computers, also called virtual machines, have become a workhorse of enterprise computing. A reason for such popularity is that business users, as well as software developers, may request a virtual computer or virtual machine and have the request fulfilled quickly. Thus, it is not necessary to visit a store and buy a physical computer, install the physical computer in a data center, power it up, and then assign the computer to a user.

A virtual machine, simply stated, is a partition of resources such as a central processing unit (CPU), random access memory (RAM) and a hard disk of a physical computer into one or more virtual machines. For example, a new partition can be created in under a minute, and a virtual machine can be provided to a user very quickly. The virtual machine may run, for example, on a back-end server in a data center and be accessed by a user from a desktop.

The virtual machine can run its own operating system, and from the perspective of the operating system, the virtual machine behaves exactly like a physical computer. Many different virtual machines can run simultaneously on the same physical computer. Such partitioning of the resources of a single physical computer into multiple virtual machines allows for greater utilization of the physical computer, because the physical computer can now run multiple applications without such applications interfering with one another, or with the operating system. A virtual machine also has one or more virtual hard disks, each of which functions in exactly the same way as a physical hard disk.

It is common knowledge that in order for a newly acquired physical computer to function properly, it is necessary to initially customize the physical computer, for example, by installing applications, loading data and configuring the physical computer to work according to the user's requirements. This customization of the physical computer typically requires a significant amount of effort and time, and more data typically accumulates on the physical computer over time. For example, when a user acquires a new physical computer, it may be provided with an operating system, such as WINDOWS® or OSX®, but time and effort are required to install applications, such as MICROSOFT OFFICE®. For more advanced usage, installation of all of the required tools on the new computer may take even longer. In addition, the user may have data, such as WORD® documents, EXCEL® files or POWERPOINT® files that are stored elsewhere. Thus, it may also be necessary to upload such data and to configure the new machine to function according to the user's needs. Such setup preparations of the new machine may consume an inordinate amount of time before a user can begin working with it.

The same scenario applies to virtual machines. However, provisioning and unprovisioning or deprovisioning a virtual machine is much simpler. For example, unprovisioning or deprovisioning a virtual machine may take less than a minute. Consequently, a user may want to reduce costs by having a particular virtual machine available for use only when actually needed. For example, a user who employs a virtual machine to process payrolls at the end of each month may need the virtual machine only during the last week of every month.

In an enterprise situation, the cost associated with a virtual machine must be paid on a weekly or monthly basis on what may be characterized as a type of rental. Because virtual machines are so easily obtainable, users may wish to have such machines available only when needed. For example, users who process payrolls at the end of the month may wish to "rent" a virtual machine only at or near the end of each month to perform payroll processing and thereafter return the virtual machine. Thus, users may want to be able to release a virtual machine when not in use, because they do not want to continue to pay "rent". However, a problem with such an arrangement is that it takes considerable time and effort, to set up a virtual computer exactly the way a user may want it to work.

Accordingly, when a user gives up a virtual machine at the end of the user's processing, the user's concern may be the potential of being required to spend a considerable amount of time in setup preparations when a new virtual machine is obtained. Because of this expensive pattern of installing all of the required tools required to customize a new virtual machine, users may not be willing to give up their virtual machines to save on "rental" costs. Thus, users may be willing to give up their virtual machines only if they are able to retain all the applications, configurations, customizations, and data on which they previously expended considerable time and effort.

The period between such uses may be days, weeks, months, or even years for certain types of work. Users may also want to share their work with co-workers within an organization or even with the entire organization. For example if payroll processing is performed regionally, a user in a particular region may configure a virtual machine with applications for payroll processing and share it with users in other regions. In addition users may want to create virtual machine templates, which they or other users can use to create new virtual machines such that the customization effort is minimized.

In order to protect the initial customization and subsequent accumulation of data, a backup arrangement of some type is typically employed to copy selected folders and files to a location outside the physical computer. Thus, if a physical computer fails or is replaced by a new physical computer, the important files can be restored from the backup arrangement. However, traditional backup arrangements are not designed to address the foregoing types of intermittent availability, sharing, and templating of virtual machines. For example, traditional backup arrangements are slow and typically store a user's content for weeks rather than months or years. Further, traditional backup arrangements typically do not allow sharing of content or storage of templates from which virtual machines can be created.

Although files which a user wishes to protect may be backed up, for example, to some type of backup such as the "cloud", backing up files may take up to several hours, depending on factors, such as the quantity of data and the location or locations from which the data may have originated outside the computer. A problem with backup in a large enterprise is the length of time required to perform a backup even in the cloud, and the fact that backup is not typically retained for more than a few months.

Further, backup is designed primarily to restore computer data in case of a disaster and is not designed to store the configurations of a computer. Thus, if a virtual machine is deleted, it must typically be rebuilt when needed at a later time, because not only are the configurations not backed up, but also the backed up data is no longer available. Thus, backup is not adequate to meet the need for a solution to the problem of giving up a virtual machine while retaining all of the configurations, applications, and data of the virtual machine.

Currently, host virtualization software, such as VMWARE VSPHERE®, allows creation of templates from which virtual machines may be provisioned. Typically, the responsibilities of a service operation, such as an information technology (IT) department, may include, for example, identifying patterns of use and building such templates. For example, the IT department may build a virtual machine template with an operating system, such as WINDOWS®, and a suite of office applications, such as MICROSOFT OFFICE®, or with an operating system, such as LINUX®, and a document database system, such as MONGODB®.

Users may then provision virtual machines from such templates and avoid the time and effort of themselves installing the operating system and office applications or database system. However, while the creation of such templates by IT departments may reduce users' customization requirements, it cannot accommodate, for example, the creation of thousands of templates by users or the saving of virtual machines as templates by users. While virtual machines may be created from templates, templates are not customized to an exact level for each user. For example, IT personnel in an enterprise may create templates for virtual machines including relatively common applications, such as MICROSOFT OFFICE®, because it may be likely that at least some users may need a virtual machine with such applications. Other templates may include other applications to meet the needs of other users, so there may be a several different template versions.

However, a user who receives a virtual machine created from a template must still perform his or her own personal customizations and/or load data belonging to the user. Further, templates are usually designed and created for use by IT personnel who operate an entity's backend servers, and users typically do not have the technical ability or access to create and publish their own templates. Neither backups nor templates solve the problem of users who wish to give up their virtual machines while retaining all of their configuration, data and programs.

There is a present need for methods and systems for creating a library of virtual hard disks, which enables a user to remove one or more virtual hard disks from the user's virtual machine and "check in" the removed disks into such library. There is a further need for such a library which enables users to clone virtual hard disks that are checked in to the library for use with other virtual machines and to allow other users to clone and use such checked-in hard disks to share such users' work.

SUMMARY OF THE INVENTION

Embodiments of the invention employ computer hardware and software, including, without limitation, one or more processors coupled to memory and non-transitory computer-readable storage media with one or more executable programs stored thereon which instruct the processors to perform the methods described herein. Thus, embodiments of the invention provide methods and systems for creating a library of hard disks that involve, for example, detaching at least one virtual hard disk loaded with pre-selected custom content from a virtual machine on a physical host computer; cataloging the detached at least one virtual hard disk loaded with said pre-selected custom content in a database together with control parameters limiting cloning of the detached at least one virtual hard disk loaded with said pre-selected custom content; and attaching the catalogued at least one virtual hard disk loaded with said pre-selected custom content from said database to said virtual machine on the physical host computer. It is to be understood that an advantage of embodiments of the invention over backups and templates is an elimination of a necessity to move images. Such images may typically be several gigabytes in size, such that movement of images may require significant compute and network resources, while image detach and attach operations are almost instantaneous. Thus, embodiments of the invention provide significant savings in terms of compute and network resource consumption. Moving images may be optional and may be required only when images are stored in a cheaper file system within the host or in an external storage system.

Aspects of embodiments of the invention may involve, for example, loading the pre-selected custom content on the at least one virtual hard disk. In other aspects, loading the pre-selected custom content on the at least one virtual hard disk attached to the virtual machine on the physical host computer may involve, for example, partitioning resources on the physical host computer into the virtual machine having said at least one virtual hard disk attached to the virtual machine. In further aspects, cataloging the detached at least one virtual hard disk in the database may involve, for example, cataloging the detached at least one virtual hard disk loaded with said pre-selected custom content in a file system on the physical host computer with a record for the detached at least one virtual hard disk loaded with said pre-selected custom content in said database together with said parameters limiting cloning of the detached at least one virtual hard disk loaded with said pre-selected custom content. In additional aspects, partitioning the resources on the physical host computer may involve, for example, partitioning resources on the physical host computer consisting at least in part of a central processing unit and a hard disk of the physical host computer into said at least one virtual machine. In other aspects, partitioning the resources on the physical host computer may involve, for example, partitioning the resources on the physical host computer into the at least one virtual machine according to a template for said at least one virtual machine. In further aspects, partitioning the resources on the physical host computer may involve, for example, partitioning the resources on the physical host computer into a plurality of virtual machines. In additional aspects, loading the pre-selected custom content may comprise, for example, loading pre-selected applications and data on the at least one virtual hard disk. In other aspects, loading the pre-selected applications and data may involve, for example, loading the pre-selected applications and data for processing a predetermined task using the at least one virtual hard disk.

In further aspects of embodiments of the invention, cataloging the detached at least one virtual hard disk in the database may involve, for example, moving the detached at least one virtual hard disk loaded with said pre-selected custom content from a first file system on the physical host computer to a second file system on the physical host computer having less expensive storage cost than said first file system. In still further aspects, cataloging the detached at least one virtual hard disk may involve, for example, moving the detached at least one virtual hard disk loaded with said pre-selected custom content from the second file system on the physical host computer to an external storage system having less expensive storage cost and greater storage capacity than said second file system. In additional aspects, cataloging the record for the detached at least one virtual hard disk loaded with said pre-selected custom content in the database may comprise, for example, cataloging a record in the database consisting at least in part of a unique storage location address for the detached at least one virtual hard disk loaded with said pre-selected custom content.

In additional aspects of embodiments of the invention, attaching the cataloged at least one virtual hard disk loaded with said pre-selected custom content may involve, for example, moving the cataloged at least one virtual hard disk loaded with said pre-selected custom content to a first file system on the physical host computer from a second file system on the physical host computer having less expensive storage cost than said first file system. In still further aspects, attaching the cataloged at least one virtual hard disk loaded with said pre-selected custom content may involve, for example, moving the cataloged at least one virtual hard disk loaded with said pre-selected custom content to the second file system on the physical host computer from an external storage system having less expensive storage cost and greater storage capacity than said second file system. In additional aspects, attaching the cataloged at least one virtual hard disk loaded with said pre-selected custom content may involve, for example, generating, according to predefined parameters, a list of cataloged virtual hard disks for which a record is stored in the database, said list consisting at least in part of the cataloged at least one virtual hard disk loaded with said pre-selected custom content. In other aspects, generating the list of cataloged virtual hard disks consisting at least in part of the cataloged at least one virtual hard disk loaded with said pre-selected custom content may involve, for example, generating the list of cataloged virtual hard disks based on user-provided criteria.

Additional aspects of embodiments of the invention may involve, for example, cloning a copy of the cataloged at least one virtual hard disk loaded with said pre-selected custom content when permitted by said control parameters cataloged with the at least one virtual hard disk loaded with said pre-selected custom content. Further aspects may involve, for example, attaching the cloned copy of the at least one virtual hard disk loaded with said pre-selected custom content to said virtual machine on the physical host computer. Other aspects may involve, for example, attaching the cloned copy of the at least one virtual hard disk loaded with said pre-selected custom content to another virtual machine on the physical host computer. Still other aspects may involve, for example, deleting the cataloged at least one virtual hard disk loaded with said pre-selected custom content from said file database.

These and other aspects of the invention will be set forth in part in the description which follows and in part will become more apparent to those skilled in the art upon examination of the following or may be learned from practice of the invention. It is intended that all such aspects are to be included within this description, are to be within the scope of the present invention, and are to be protected by the accompanying claims.

DETAILED DESCRIPTION

Reference will now be made in detail to embodiments of the invention, one or more examples of which are illustrated in the accompanying drawings. Each example is provided by way of explanation of the invention, not as a limitation of the invention. It will be apparent to those skilled in the art that various modifications and variations can be made in the present invention without departing from the scope or spirit of the invention. For example, features illustrated or described as part of one embodiment can be used in another embodiment to yield a still further embodiment. Thus, it is intended that the present invention cover such modifications and variations that come within the scope of the invention.

Embodiments of the invention provide systems and methods for creating and maintaining a library of virtual hard disks. Thus, embodiments of the invention provide a solution to the problem of protecting and saving user data for long periods of time, while allowing users to become authors of templates, also referred to herein as images, which can be used to create virtual machines that require little or no customization.

In embodiments of the invention, users may remove virtual hard disks from the users' virtual machines and "check in" such removed hard disks to the library for embodiments of the invention. Thus, a virtual hard disk may be unplugged, an entry may be made in a database that the particular virtual hard disk belongs to a particular user, and that the virtual hard disk was unplugged on a particular date at a particular time. The database entry may also include a description of the virtual hard disk contents provided by the user. In addition, a concept of permissions for the virtual hard disk may allow sharing of the virtual hard disk as well. Users may also clone hard disks in the library for use with other virtual machines.

Embodiments of the invention also provide a mechanism for users to share their images with other users in a controlled manner. For example, users may allow other users to share their work by cloning and using their hard disks. To accomplish this, a user who unplugs his or her virtual hard disk may specify other users or groups of users who may be permitted to make one or more clones or copies of the user's virtual hard disk and attach the copies to their own virtual machines. The result is a library of virtual hard disks which can be checked in and checked out and shared between multiple users of the library. Thus, embodiments of the invention may replace currently employed backup arrangements, as well as currently used template systems.

Figure 1:
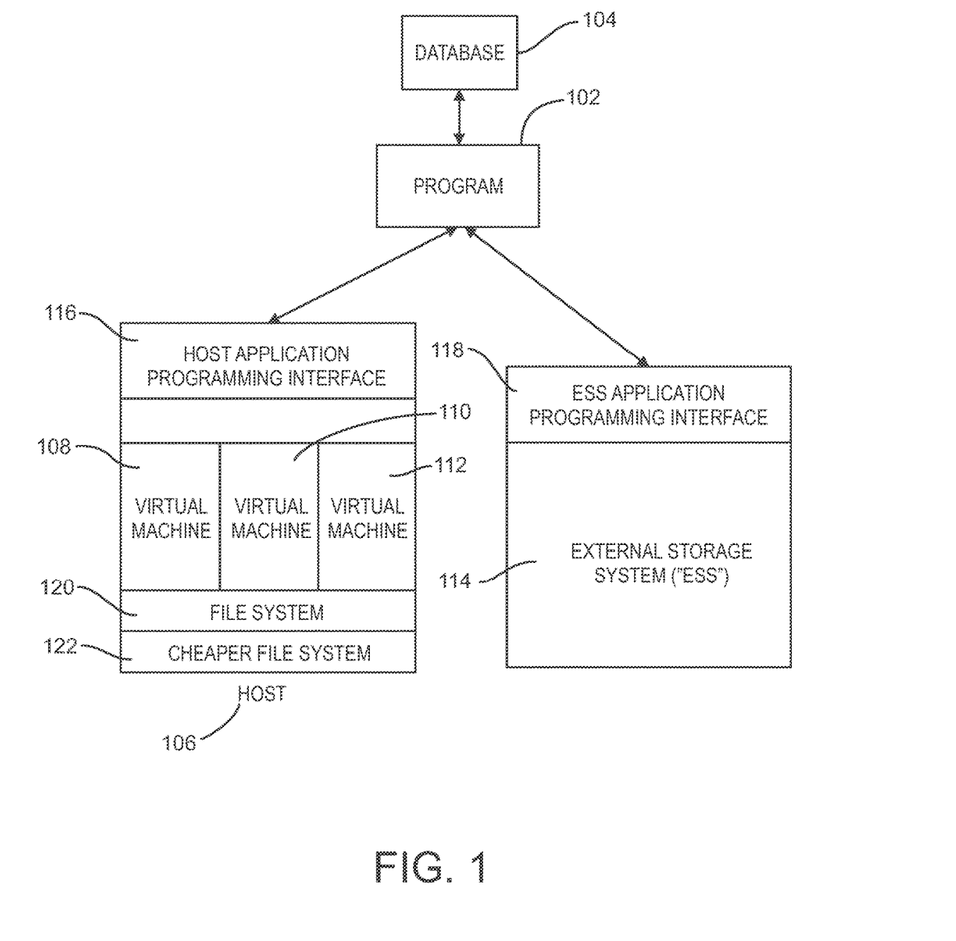
FIG. 1 is a schematic diagram that illustrates an overview example of components and the flow of information between components for embodiments of the invention.

FIG. 1 is a schematic diagram that illustrates an overview example of components and the flow of information between components for embodiments of the invention. The library for embodiments of the invention may be implemented, for example, as a software program 102 that directs the movement of information about virtual hard disks and the storage of such information on a database 104. Referring to FIG. 1, embodiments of the invention may employ, for example, one or more processors of a host 106 running the program 102 and the database 104.

In embodiments of the invention, the host 106 may be a physical computer whose resources are partitioned into one or more virtual machines, such as virtual machines 108, 110, and 112. While only virtual machines 108, 110, and 112 are shown in the example of FIG. 1, it is to be understood that the host's resources may be partitioned into any number of virtual machines. The program 102 for embodiments of the invention may instruct one or more processors on the physical host computer 106 to run special software and/or special operating systems to create one or more virtual machines, such as virtual machines 108, 110, and 112, on the physical host computer. Examples of such software may include, for example, VMWARE ESX® or VSPHERE®, MICROSOFT HYPER-V®, and LINUX KVM®.

Referring further to FIG. 1, each virtual machine 108, 110, and 112 may be a partition of the resources of the host 106 that may include, for example, a virtual central processing unit (CPU), virtual random access memory (RAM), a virtual hard disk, and a virtual network card, made to appear as a physical computer. A virtual operating system that runs within a virtual machine may be referred to as a guest, and the virtual hard disk may be a representation of a hard disk inside a virtual machine. To a guest, the virtual hard disk behaves exactly like a physical hard disk.

Referring further to FIG. 1, the program 102 for embodiments of the invention may cause the one or more processors to manipulate one or more of the virtual machines 108, 110, and 112 and virtual hard disks within the host 106 and may optionally store and retrieve images into an external storage system 114. The program 102 for embodiments of the invention may run on one or more processors outside the host 106 and may cause the one or more processors to connect to the host, for example, to manipulate one or more virtual hard drives and virtual machines, using the host's application programming interface (API) 116 over a TCP/IP computer network.

In embodiments of the invention, the (API) 116 is exposed by the host software to allow the program 102 to cause the one or more processors to manipulate virtual machines and virtual hard disks, as well as to export and import images, may be referred to as the host API. An example of a host API may be VMWARE VSPHERE® simple object access protocol (SOAP) API. For example, in case of one or more processors of a host 106 running VSPHERE® software from VMWARE®, the program may use VSPHERE® simple object access protocol (SOAP) API available either directly from the host 106 or from VMWARE VCENTER® software. In addition, an external storage system API 118 may refer to an API exposed by the external storage system 114 to allow the program 102 for embodiments of the invention to cause the one or more processors to store and retrieve images. An example of an external storage system API may be AMAZON WEB SERVICE S3®.

The program 102 for embodiments of the invention may be written in any programming language and run on any computer running any operating system. The program 102 may be made available to users, for example, as a web application, an API, or as a command line interface. Other applications, such as cloud portal applications, may also call the program 102 on behalf of users such that the functionality offered by the program becomes a subset of a larger cloud orchestration system. Such cloud orchestrating system may be responsible for provisioning of virtual machines to users.

It is to be understood that the program 102 for embodiments of the invention may run, for example, in a data center as a service and may not be run directly by end users. The program 102 for embodiments of the invention may be deployed via a cloud portal which users may access to provision virtual machines. Thus, a user who needs a virtual machine may visit the cloud portal and request a virtual machine with a particular operating system and specific applications. Typically, the program 102 for embodiments of the invention may become a part of a cloud portal and thus add functionality to the cloud portal. While the program may be used directly by end users, a user in an enterprise may typically access the cloud portal to use the program to request a virtual machine from the library for embodiments of the invention.

Referring further to FIG. 1, the program 102 for embodiments of the invention may cause the one or more processors to connect to the database 104 to store information about images. Each image may be represented by exactly one record in the database 104. The database 104 may be, for example, a simple text file, a structured query language (SQL) database, such as MICROSOFT SQL SERVER® or ORACLE®, or a Non-SQL database such as MONGODB®. The program 102 may cause the one or more processors to connect directly to the database 104 when the database is a text file, or through a computer network. The database 104 may be on the same physical computer as the program 102, or the database may be on a separate physical computer that is reachable through a computer network. Records in the database 104, each of which represents a single image, comprises the library for embodiments of the invention.

Figure 2:
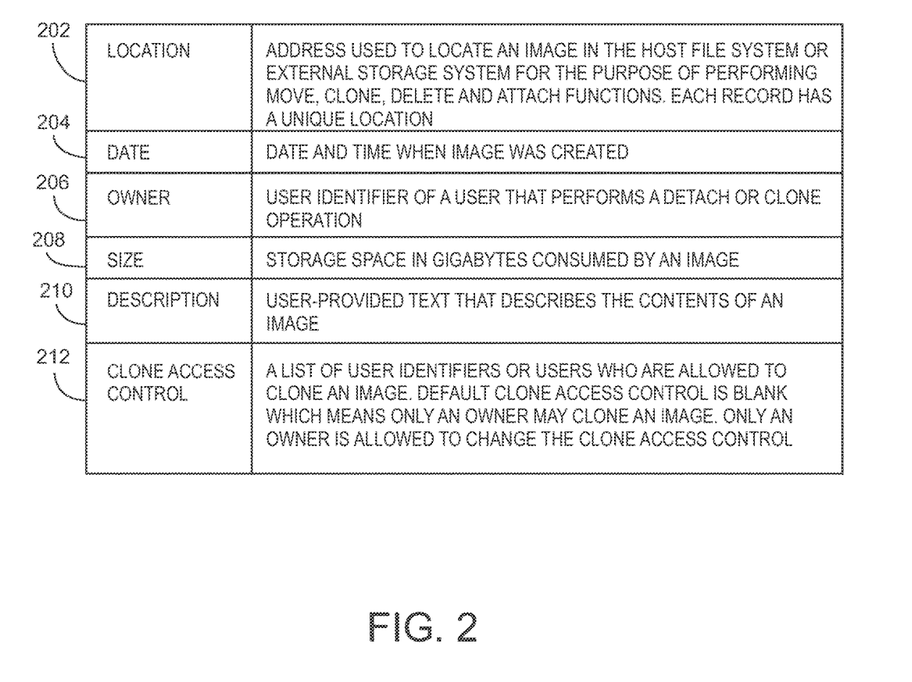
FIG. 2 is a table that illustrates examples of fields for each record in the database for embodiments of the invention.

FIG. 2 is a table that illustrates examples of fields for each record in the database 104 for embodiments of the invention. Referring to FIG. 2, each record in the database 104 may comprise fields, such as location 202, date 204, owner 206, size 208, description 210, and clone access control 212. The location field 202 may refer to a unique address for each record that can be used to locate an image in one of the host file systems 120 or 122 or in the external storage system 114, as shown in FIG. 1, for the purpose of performing a move, clone, delete or attach function. The date field 204 may refer to the date and time when an image was created, and the owner field 206 may refer to the user identifier of the user that performs a detach or clone operation, as hereinafter described.

Referring further to FIG. 2, the size field 208 may refer to the storage space in gigabytes that is consumed by an image, and the description field 210 may refer to user-provided text that describes the contents of an image. The clone access control field 212 may refer to a list of user identifiers for users who are allowed to clone an image. The default condition of the clone access control field 212 may be blank to indicate that only the owner may clone an image, and only the owner may be allowed to change the clone access control field. An owner may be identified by a unique user identifier. Users may include personnel who employ one of more virtual machines and are responsible for either system administration of such virtual machines or running applications within such virtual machines for business purposes. Each user may have a unique user identifier within a company, which may typically be maintained in centralized directory services, such as ACTIVE DIRECTORY® or lightweight director access protocol (LDAP).

Figure 3:
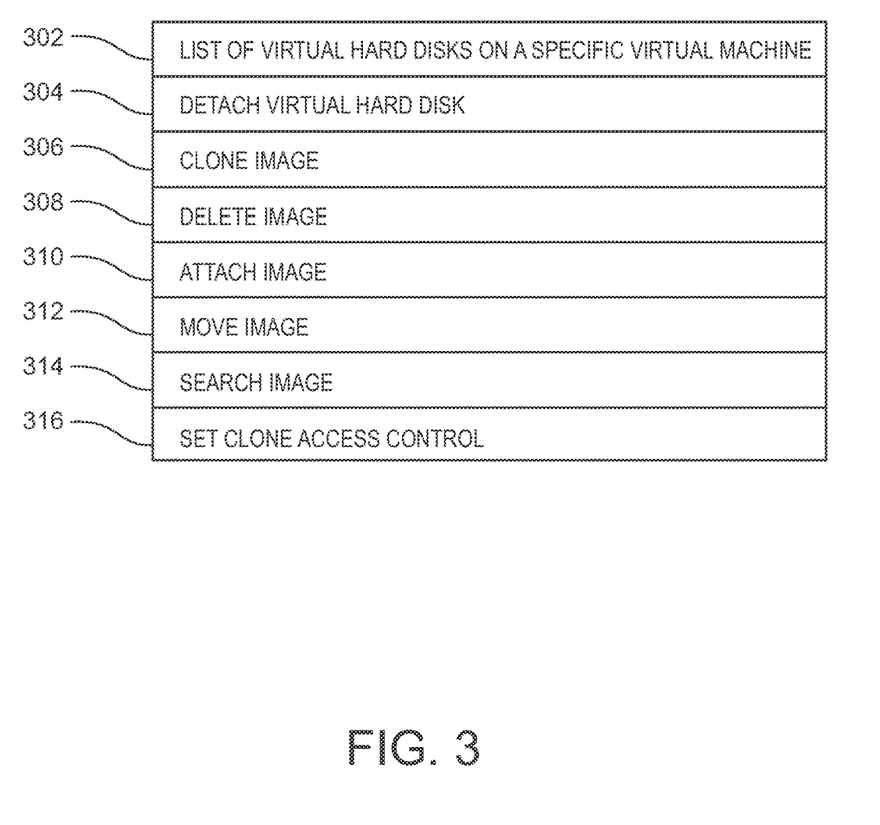
FIG. 3 is a table that illustrate examples of processes performed by embodiments of the invention.

The program 102 for embodiments of the invention may cause the one or more processors to perform a number of functions responsive, for example, to a user or cloud portal request. FIG. 3 is a table that illustrates examples of processes performed by embodiments of the invention. Such functions may include, for example, a list of virtual hard disks on a specific virtual machine function 302, a detach virtual hard disk function 304, a clone image function 306, a delete image function 308, an attach image function 310, a move image function 312, a search image function 314, and a set clone access control function 316.

In embodiments of the invention, most virtual hard disks are represented as files on the host file system, and each virtual hard disk is precisely one file that may be referred to as a backing file. The attach image function 310 for embodiments of the invention may refer to a process of making an image appear as a virtual hard disk within a virtual machine, which may be likened to connecting a physical hard drive to a physical computer. Once an image appears as a virtual hard disk within a virtual machine, it may be referred to as the backing file The detach virtual hard disk function 304 for embodiments of the invention may refer to a process of causing a backing file to discontinue to appear as a virtual hard disk within a virtual machine, which may be likened to removing a physical hard drive from a physical computer. Once a backing file is detached, it may be referred to as an image. According to embodiments of the invention, the move function 312 may refer to a process of moving an image from one location to another, such as between a file system 120 and a cheaper file system 122 or an external storage system 114, as shown in FIG. 1.

Referring to FIG. 1, the file system 120 may refer to storage capacity of the host 106 where backing files may be stored. The cheaper file system 122 may refer to an optional file system on the host 106 where per unit storage capacity is less costly than in file system 120. Generally the cheaper file system 122 may not have adequate performance for backing files and may be suitable only for images. Storage capacity that is outside the control of the host may be referred to as the external storage system 114. For reasons, such as capacity and/or cost, the external storage system 114 may be optionally used with the system for embodiments of the invention to store images. Examples of external storage systems may be an object storage system supporting, for example, AMAZON S3® and/or SWIFT® protocols, NETWORK FILE SYSTEMS® share, or SERVER MESSAGE BLOCK® share.

In embodiments of the invention, the clone image function 306 may refer to the process of cloning an image to create a new image with exactly the same content. The newly created image may have a new, unique location, which may refer to a complete address for programmatically accessing an image, for example, within the file system 120, the cheaper file system, 122 or the external storage system 114 for the purpose of cloning, moving, detaching, attaching or deleting the image. Each image may have a unique location, and thus the image location may also be used to uniquely identify each image. In embodiments of the invention, the delete image function 308 may refer to a process of deleting an image in order to recover storage space. The search image function 314 may refer to the process of listing image records from the database based on user-provided criteria.

In embodiments of the invention, the list of virtual hard disks on a specific virtual machine function 302 may list all the virtual hard disks connected to a specified virtual machine. The output from the list of virtual hard disks function 302 may be used, for example, for a subsequent detach function. An input for the list of virtual hard disks function 302 may include, for example, a unique identifier of a specific virtual machine. In response to such input, the program 102 for embodiments of the invention may cause the one or more processors to use the host API 116 to request a list of virtual hard disks attached to the specific virtual machine and output such a list, together with a unique identifier for each virtual hard disk, such as a universally unique identifier (UUID) or a small computer system interface identifier (SCSI ID).

Figure 4:
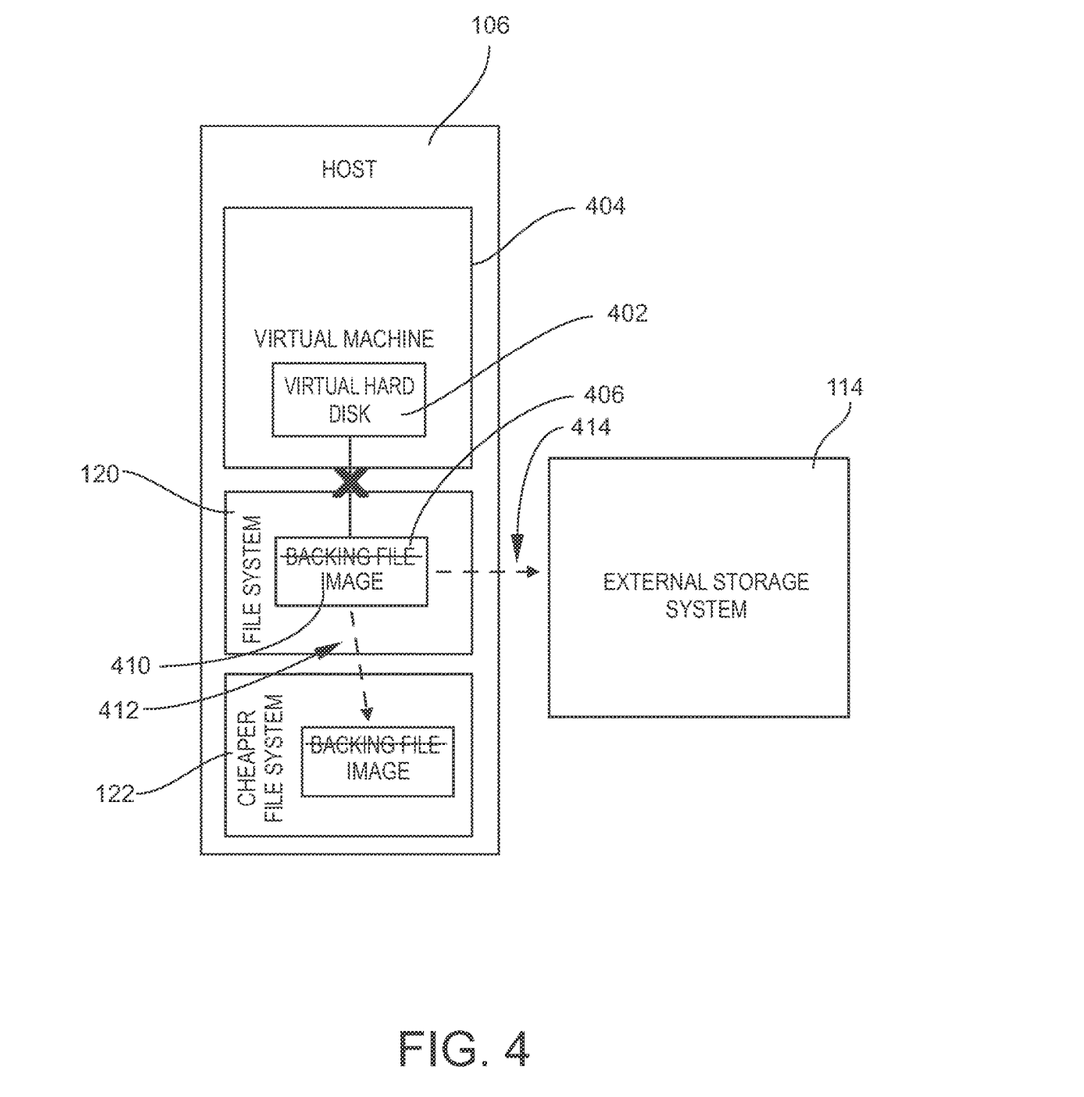
FIG. 4 is a schematic diagram that illustrates an example of the process of detaching a virtual hard disk from a specific virtual machine for embodiments of the invention.

FIG. 4 is a schematic diagram that illustrates an example of the process of detaching a virtual hard disk from a specific virtual machine for embodiments of the invention. Referring to FIG. 3 and FIG. 4, the detach virtual hard disk function 304 for embodiments of the invention may disconnect a specified virtual hard disk, such as virtual hard disk 402 from a specified virtual machine, such as virtual machine 404. The backing file 406 may remain on the file system 120 and may be referred to as an image 410 after the disconnection. Optionally, the program 102 for embodiments of the invention may cause the one or more processors to move the image 410, at 412, to the cheaper file system 122 or, at 414, to the external storage system 114 for capacity and/or cost reasons. The program 102 may also cause the one or more processors to create a new record for the newly created image in the database 104.

Input for the detach virtual hard disk function 304 may include, for example, a user identifier, a virtual machine identifier, and a virtual hard disk identifier within the virtual machine 404, which may be obtained from the list virtual hard disk function, and text to describe contents of the virtual hard disk 402 being detached. In response to the input, the program 102 for embodiments of the invention may cause the one or more processors to use the host API 116 to disconnect the specified virtual hard disk 402 from the specified virtual machine 404 and may optionally move the mage 410 to the cheaper file system 122 or the external storage system 114. In addition, the program 102 may cause the one or more processors to connect to the database 104 and insert a record containing the fields previously described with reference to FIG. 2.

The clone image function 306 for embodiments of the invention may enable sharing of an image between virtual machines that belong to a same user, or with virtual machines that belong to other users. The clone image function 306 may also allow users to save incremental copies of their work. For example, a user may clone an image, attach the image to another virtual machine, customize the image further, and detach the image. Only the owner of an image or users listed in a cloning access control 212, as shown in FIG. 2, for the image are permitted to perform a clone image function 306 for the image. Once a clone image function 306 is performed, the cloned image is deemed to be owned by the user who requested the cloning operation and is treated as a new image as if it were created as a result of a detach virtual hard disk operation 302.

Inputs for the clone image function 306 for embodiments of the invention may include, for example, a user identifier for the user who requests the clone operation and the location for the image. In response to the inputs, the program 102 for embodiments of the invention may cause the one or more processors to connect to the database 104 and retrieve the record matched by the location that is provided. The program 102 may cause the one or more processors to attempt to match the provided user identifier to the owner field in the record. If that match fails, the program may cause the one or more processors to attempt to match the user identifier to the cloning access control field 212 in the record. If both matches fail, the program 102 may cause the one or more processors to abort the operation.

If the location field 202 in the record is within the external storage system 114, the program 102 may cause the one or more processors to use the external storage system API 118 to clone an image. Otherwise, the program 102 may cause the one or more processors to use the host API 116 to clone the image. The cloned image may be stored in the same file system 120, cheaper file system 122 or external storage system 114 as the original image but with a new, unique location. In addition, the program 102 may cause the one or more processors to connect to the database 104 and insert a record containing the fields previously described with reference to FIG. 2.

The delete image function 308 for embodiments of the invention may delete a user-specified image to recover storage space. Only an owner of an image is permitted to delete an image. Users may delete images, for example, which are older versions that they do not wish to retain or that may no longer be relevant to their work. Inputs for the delete image function 308 may include, for example, a user identifier and a location for the image. Responsive to the inputs, the program 102 may cause the one or more processors to connect to the database 104 and retrieve a record matched by the input location and match the user identifier to the owner field in the record. If a match is not found, the operation may be aborted. If the location is within the file system 120 or the cheaper file system 122, the program 102 may cause the one or more processors to delete the image. Otherwise, if the location is within the external storage system 114, the program 102 may cause the one or more processors to use the external storage system API 118 to delete the image. Thereafter, the program 102 may cause the one or more processors to connect to the database and delete the record matched by the location.

The attach image function 310 for embodiments of the invention may connect an image to one or more specified virtual machines. The connected image may appear as a virtual hard disk within the one or more virtual machines. Only the owner of an image may be permitted to perform this operation. If the location of the image is within the cheaper file system 122 or the external storage system 114, the image may first be moved to the file system 120 and then attached or connected to the one or more specified virtual machines, and once attached, the image may be referred to as a backing file.

Inputs for the attach image function 310 for embodiments of the invention may include, for example, a user identifier, a location, and a virtual machine identifier. In response to the inputs, the program 102 for embodiments of the invention may cause the one or more processors to connect to the database 104 and retrieve the record matched by the location and attempt to match the user identifier with the owner field in the record. If a match is not found, the program 102 may cause the one or more processors to abort the operation. If the location in the record is within the cheaper file system 122 or the external storage system 114, the program 102 may cause the one or more processors to move the image to the file system. The program 102 may then cause the one or more processors to use the host API 116 to connect the image to the virtual machine and connect to the database 104 and delete the record matched by the location.

The move image function 312 for embodiments of the invention is never requested by a user but may instead be requested by the detach 304 and attach 310 functions based on policy created by a service operator, such as an information technology department. The move image function 312 enables expanded capacity as well as a reduction in the cost of storage of images. Images may be moved, for example, within the host 106 between the file system 120 and the cheaper file system 122. Because such movement is within the host 106, a computer network resource may not be used. Such a move is also significantly faster than moving to the external storage system 114 or taking a backup.

If the cheaper file system 122 is deficient in capacity or does not exist, the external storage system 114 may also be used to store images. However, moving images between the file system 120 and the external storage system 114 uses computer network resources and is relatively slower than moving images within the host 106. The computer running the program 102 for embodiments of the invention may have access, for example, to both the host 106 and the external storage system 114 over a computer network.

The program 102 for embodiments of the invention may cause the one or more processors to pull or push an image from the host 106 and external storage system 114 using the respective APIs 116 and 118 of the host and the external storage system. The program 102 for embodiments of the invention may cause the one or more processors to optionally compress an image when storing from the file system 120 into the external storage system 114, and to decompress the image when retrieving the image from the external storage system 114 into the file system 120. Because images are generally several gigabytes in size, more than one instance of a move subprogram within the program 102 for embodiments of the invention may be deployed to run image moves in parallel. In this configuration the program 102 may direct each instance of the move subprogram and balance load between all instances of the move subprogram.

Figure 5:
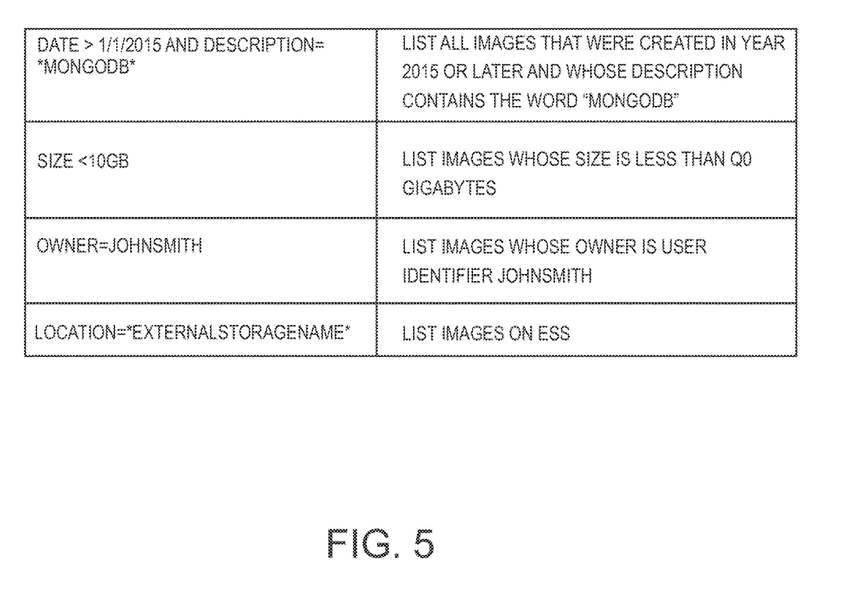
FIG. 5 is a table that illustrates examples of search criteria for the search image function for embodiments of the invention.

In order to attach, clone or delete an image, it is necessary for a user to identify one of many available images in the system for embodiments of the invention. The search image function 314 for embodiments of the invention enables a user to list images based, for example, on criteria specified by the user from the database 104. The criteria may comprise a list of field values that may be combined with "AND" or "OR" logical operators; some or all fields may be used in the criteria; and wildcard characters such as "*" and "?" may also be used when part of the field value is known. FIG. 5 is a table that illustrates examples of search criteria for the search image function for embodiments of the invention.

Additionally, the search image function 314 may list only those images for which a match is found for the requesting user identifier in either the owner field or the clone access control field. The listing of the search image function 314 may show all fields in each record that matches the criteria. When the program 102 for embodiments of the invention is invoked from a graphical interface such as a cloud portal, the search image function 314 may be represented with graphical constructs so that a user may intuitively define the criteria without any technical training.

In embodiments of the invention, only users who are listed in the clone access control field for an image are allowed to perform a clone operation on the image. After cloning, users may attach the cloned image to their respective virtual machines. Thus, controlling access to cloning controls the sharing of images. The set clone access control function 316 for embodiments of the invention enables a user-owner of an image to set the user Identifiers in the clone access control field of a specified image record in the database. The clone access control field for an image remains empty unless it is set, and no one other than the owner may clone the image if the field is empty.

Inputs for the set clone access control function 316 for embodiments of the invention may include, for example, a user identifier of the user requesting the operation and a location. Responsive to the inputs, the program 102 for embodiments of the invention may cause the one or more processors to retrieve a record from database 104 matched by the input location and match the provided user identifier with the owner field in the record. If no match is found, the operation is aborted; otherwise, the clone access control field within the record is updated.

Figure 6:
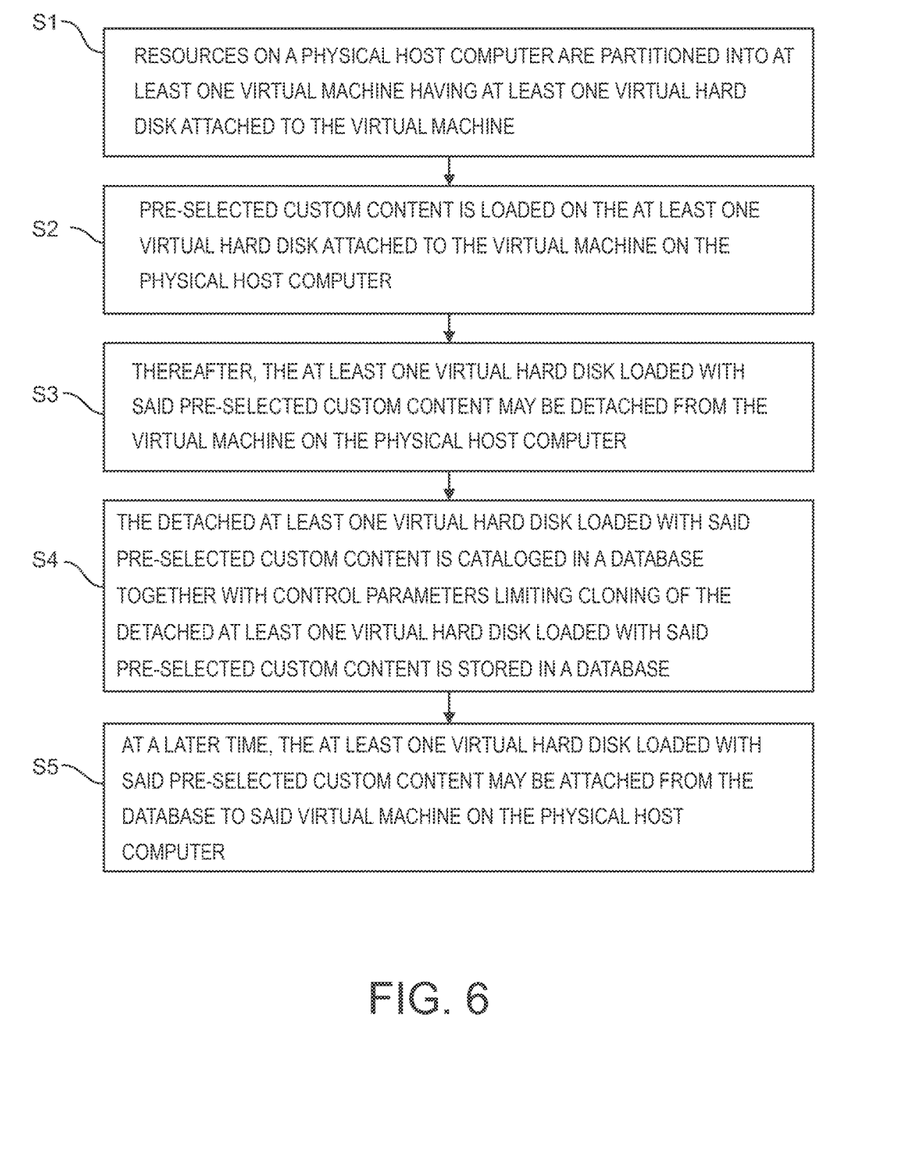
FIG. 6 is a flow chart which illustrates an overview example of the process of creating and maintaining a library of virtual hard disks for embodiments of the invention.

FIG. 6 is a flow chart which illustrates an example of the process of creating and maintaining a library of virtual hard disks for embodiments of the invention. Referring to FIG. 6, at S1, resources on a physical host computer are partitioned into at least one virtual machine having at least one virtual hard disk attached to the virtual machine, and at S2, pre-selected custom content is loaded on the at least one virtual hard disk attached to the virtual machine on the physical host computer. Thereafter, at S3, the at least one virtual hard disk loaded with said pre-selected custom content may be detached from the virtual machine on the physical host computer, and at S4, the detached at least one virtual hard disk loaded with said pre-selected custom content may be cataloged in a database together with control parameters limiting cloning of the detached at least one virtual hard disk loaded with said pre-selected custom content. At a later time, at S5, the cataloged at least one virtual hard disk loaded with said pre-selected custom content may be attached from the database to said virtual machine on the physical host computer.

It is to be understood that the application code for embodiments of the invention may be built, for example, in multiple layers (e.g., WPF, JAVA, C++, and C#) to allow its flexibility. It is to be further understood that embodiments of the invention may be implemented as processes of a computer program product, each process of which is operable on one or more processors either alone on a single physical platform, such as a personal computer, or across a plurality of devices, connected by a system or network, including networks such as the Internet, an intranet, a WAN, a LAN, a cellular network, or any other suitable communication network.

Embodiments of the invention may employ client devices that may each comprise a computer-readable medium, including but not limited to, random access memory (RAM) coupled to a processor. The processor may execute computer-executable program instructions stored in memory. Such processors may include, but are not limited to, a microprocessor, an application specific integrated circuit (ASIC), and or state machines. Such processors may comprise, or may be in communication with, media, such as computer-readable media, which stores instructions that, when executed by the processor, cause the processor to perform one or more of the steps described herein.

It is also to be understood that such computer-readable media may include, but are not limited to, electronic, optical, magnetic, RFID, or other storage or transmission device capable of providing a processor with computer-readable instructions. Other examples of suitable media include, but are not limited to, CD-ROM, DVD, magnetic disk, memory chip, ROM, RAM, ASIC, a configured processor, optical media, magnetic media, or any other suitable medium from which a computer processor can read instructions. Embodiments of the invention may employ other forms of such computer-readable media to transmit or carry instructions to a computer, including a router, private or public communication network, or other transmission device or channel, both wired or wireless. Such instructions may comprise code from any suitable computer programming language including, without limitation, C, C++, C#, Visual Basic, Java, Python, Perl, and JavaScript. Embodiments of the invention may also employ one or more special-purpose programming languages, such as Structured Query Language designed, for example, for managing data held in a relational database management system, or for stream processing in a relational data stream management system.

It is to be further understood that client devices that may be employed by embodiments of the invention may also comprise a number of external or internal devices, such as a mouse, a CD-ROM, DVD, keyboard, display, or other input or output devices. In general, such client devices may be any suitable type of processor-based platform that is connected to a network and that interacts with one or more application programs and may operate on any suitable operating system. Server devices may also be coupled to the network and, similarly to client devices, such server devices may comprise a processor coupled to a computer-readable medium, such as a random access memory (RAM). Such server devices, which may be a single computer system, may also be implemented as a network of computer processors. Examples of such server devices are servers, mainframe computers, networked computers, a processor-based device, and similar types of systems and devices.

What is claimed is:

1. A method, comprising:

detaching, by the one or more processors, from a virtual machine on a physical host computer, at least one virtual hard disk loaded with pre-selected custom content consisting at least in part of internal data of an enterprise for processing one or more predetermined repetitive tasks of the enterprise on the virtual machine;

cataloging, by the one or more processors, the detached at least one virtual hard disk loaded with said pre-selected custom content consisting at least in part of said internal data of the enterprise for processing the one or more predetermined repetitive tasks of the enterprise on the virtual machine in a database together with a database library record with fields for at least an identifier of an owner and clone access control parameters comprising a list of identifiers of users permitted to clone the detached at least one virtual hard disk with a default condition permitting cloning of the detached at least one virtual hard disk loaded with said pre-selected custom content consisting at least in part of said internal data of the enterprise for processing the one or more predetermined repetitive tasks of the enterprise on the virtual machine only by the owner when no identifiers of users are listed in the library record for the detached at least one virtual hard disk; and reattaching, by the one or more processors, the cataloged at least one virtual hard disk loaded with said pre-selected custom content consisting at least in part of said internal data of the enterprise for processing the one or more predetermined repetitive tasks of the enterprise on the virtual machine from the database to said virtual machine on the physical host computer.

2. The method of claim 1, further comprising loading, by the one or more processors, said pre-selected custom content consisting at least in part of said internal data of the enterprise for processing the one or more predetermined repetitive tasks of the enterprise on the virtual machine on the at least one virtual hard disk.

3. The method of claim 2, wherein loading the pre-selected custom content on the at least one virtual hard disk attached to the virtual machine on the physical host computer further comprises partitioning resources on the physical host computer into the virtual machine having said at least one virtual hard disk attached to the virtual machine.

4. The method of claim 3, wherein partitioning the resources on the physical host computer further comprises partitioning resources on the physical host computer consisting at least in part of a central processing unit and a hard disk of the physical host computer into said at least one virtual machine.

5. The method of claim 4, wherein partitioning the resources on the physical host computer further comprises partitioning the resources on the physical host computer into the at least one virtual machine according to a template for said at least one virtual machine.

6. The method of claim 4, wherein partitioning the resources on the physical host computer further comprises partitioning the resources on the physical host computer into a plurality of virtual machines.

7. The method of claim 2, wherein loading the pre-selected custom content further comprises loading pre-selected applications and said internal data of the enterprise for processing the one or more predetermined repetitive tasks of the enterprise on the at least one virtual hard disk.

8. The method of claim 7, wherein loading the pre-selected applications and internal data of the enterprise further comprises loading the pre-selected applications and said internal data of the enterprise for processing the one or more predetermined repetitive tasks of the enterprise using the at least one virtual hard disk.

9. The method of claim 1, wherein cataloging the detached at least one virtual hard disk further comprises moving the detached at least one virtual hard disk loaded with said pre-selected custom content consisting at least in part of said internal data of the enterprise for processing the one or more predetermined repetitive tasks of the enterprise on the virtual machine from a first file system on the physical host computer to a second file system on the physical host computer having less expensive storage cost than said first file system.

10. The method of claim 9, wherein cataloging the detached at least one virtual hard disk further comprises moving the detached at least one virtual hard disk loaded with said pre-selected custom content consisting at least in part of said internal data of the enterprise for processing the one or more predetermined repetitive tasks of the enterprise on the virtual machine from the second file system on the physical host computer to an external storage system having less expensive storage cost and greater storage capacity than said second file system.

11. The method of claim 1, wherein cataloging the detached at least one virtual hard disk loaded with said pre-selected custom content consisting at least in part of said internal data of the enterprise for processing the one or more predetermined repetitive tasks of the enterprise on the virtual machine in the database further comprises cataloging the detached at least one virtual hard disk loaded with said pre-selected custom content consisting at least in part of said internal data of the enterprise for processing the one or more predetermined repetitive tasks for the enterprise on the virtual machine in the database together with the database library record with a field for a unique storage location address for the detached at least one virtual hard disk loaded with said pre-selected custom content consisting at least in part of said internal data of the enterprise for processing the one or more one or more predetermined repetitive tasks of the enterprise on the virtual machine.

12. The method of claim 1, wherein reattaching the cataloged at least one virtual hard disk loaded with said pre-selected custom content consisting at least in part of said internal data of the entity for processing the one or more one or more predetermined repetitive tasks of the enterprise on the virtual machine further comprises moving the cataloged at least one virtual hard disk loaded with said pre-selected custom content consisting at least in part of said internal data of the entity for processing the one or more predetermined repetitive tasks of the enterprise on the virtual machine to a first file system on the physical host computer from a second file system on the physical host computer having less expensive storage cost than said first file system.

13. The method of claim 12, wherein reattaching the cataloged at least one virtual hard disk loaded with said pre-selected custom content consisting at least in part of said internal data of the enterprise for processing the one or more predetermined repetitive tasks of the enterprise on the virtual machine further comprises moving the cataloged at least one virtual hard disk loaded with said pre-selected custom content consisting at least in part of said internal data of the enterprise for processing the one or more predetermined repetitive tasks of the enterprise on the virtual machine to the second file system on the physical host computer from an external storage system having less expensive storage cost and greater storage capacity than said second file system.

14. The method of claim 1, wherein reattaching the cataloged at least one virtual hard disk loaded with said pre-selected custom content consisting at least in part of said internal data of the entity for processing the one or more predetermined repetitive tasks of the enterprise on the virtual machine further comprises generating, according to pre-defined parameters, a list of cataloged virtual hard disks for which a record is stored in the database, said list consisting at least in part of the cataloged at least one virtual hard disk loaded with said pre-selected custom content consisting at least in part of said internal data of the enterprise for processing the one or more predetermined repetitive tasks of the enterprise on the virtual machine.

15. The method of claim 14, wherein generating the list of cataloged virtual hard disks consisting at least in part of the cataloged at least one virtual hard disk loaded with said pre-selected custom content consisting at least in part of said internal data of the enterprise for processing the one or more predetermined repetitive tasks of the enterprise on the virtual machine further comprises generating the list of cataloged virtual hard disks based on user-provided criteria.

16. The method of claim 1, further comprising cloning a copy of the cataloged at least one virtual hard disk loaded with said pre-selected custom content consisting at least in part of said internal data of the enterprise for processing the one or more predetermined repetitive tasks of the enterprise on the virtual machine when permitted by said control parameters cataloged with the detached at least one virtual hard disk loaded with said pre-selected custom content consisting at least in part of said internal data of the enterprise for processing the one or more predetermined repetitive tasks of the enterprise on the virtual machine.

17. The method of claim 16, further comprising attaching the cloned copy of the at least one virtual hard disk loaded with said pre-selected custom content consisting at least in part of said internal data of the enterprise for processing the one or more predetermined repetitive tasks of the enterprise on the virtual machine to said virtual machine on the physical host computer.

18. The method of claim 16, further comprising attaching the cloned copy of the at least one virtual hard disk loaded with said pre-selected custom content consisting at least in part of said internal data of the enterprise for processing the one or more predetermined repetitive tasks of the enterprise on the virtual machine to another virtual machine on the physical host computer.

19. The method of claim 1, further comprising deleting the cataloged at least one virtual hard disk loaded with said pre-selected custom content consisting at least in part of said internal data of the enterprise for processing the one or more predetermined repetitive tasks of the enterprise on the virtual machine from said database.

20. A system, comprising:
one or more processors coupled to memory and programmed to:
detach, from a virtual machine on a physical host computer, at least one virtual hard disk loaded with pre-selected custom content consisting at least in part of internal data of an enterprise for processing one or more predetermined repetitive tasks of an enterprise on the virtual machine;
catalog the detached at least one virtual hard disk loaded with said pre-selected custom content consisting at least in part of said internal data of the enterprise for processing the one or more predetermined repetitive tasks of the enterprise on the virtual machine in a database together with a database library record with fields for at least an identifier of an owner and clone access control parameters comprising a list of users permitted to clone the detached at least one virtual hard disk with a default condition permitting cloning of the detached at least one virtual hard disk loaded with said pre-selected custom content consisting at least in part of said internal data of the enterprise for processing the one or more predetermined repetitive tasks of the enterprise on the virtual machine only by the owner when no users are listed in the library record for the detached at least one virtual hard disk; and
reattach the cataloged at least one virtual hard disk loaded with said pre-selected custom content consisting at least in part of said internal data of the enterprise for processing the one or more predetermined repetitive tasks of the enterprise on the virtual machine from said database to said virtual machine on the physical host computer.

\* \* \* \* \*